(No Model.)
T. J. & W. RAWLS.
PLOW.
No. 496,538. Patented May 2, 1893.
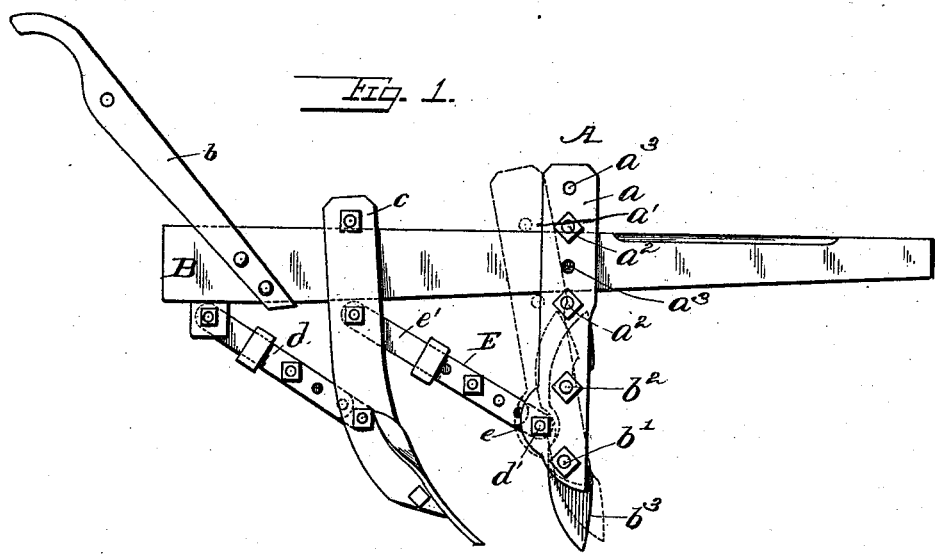
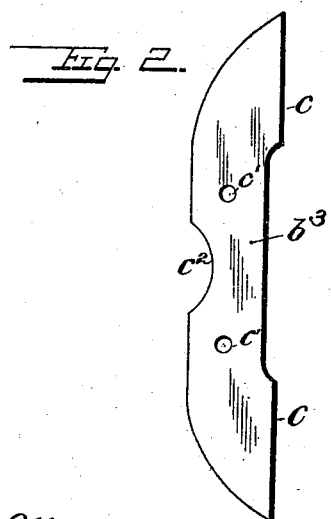
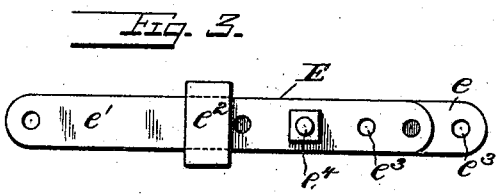
Attest:
Walter Famariss
Annie A. Lansdale
Inventors:
Thomas J. Rawls.
William Rawls
By John S. Duffie
Attorney.

UNITED STATES PATENT OFFICE.

THOMAS JEFFERSON RAWLS AND WILLIAM RAWLS, OF ELON, ARKANSAS.

PLOW.

SPECIFICATION forming part of Letters Patent No. 496,538, dated May 2, 1893.

Application filed December 17, 1892. Serial No. 455,538. (No model.)

*To all whom it may concern:*

Be it known that we, THOMAS JEFFERSON RAWLS and WILLIAM RAWLS, citizens of the United States, residing at Elon, in the county of Ashley and State of Arkansas, have invented certain new and useful Improvements in a New and Useful Plow; and we do declare the following to be a full, clear, and exact description of the invention, such as will enable others skilled in the art to which it appertains to make and use the same, reference being had to the accompanying drawings, and to the letters of reference marked thereon, which form a part of this specification.

Our invention has relation to colter attachments; and consists in the novel construction and arrangement of its parts.

In the accompanying drawings: Figure 1, is a side elevation of a plow with our invention attached thereto. Fig. 2, is a view of the colter. Fig. 3, is a view of the adjustable brace.

Our invention is described as follows:

In the accompanying drawings, B, represents a plow beam; $b$, the handles, $c$, the plow standard and $d$, the brace.

The colter attachment consists of a standard, A, in two parts, $a$, $a'$, one on each side of the beam. These parts are each provided with six perforations $a^2$, in a vertical line, so that said parts may be clamped by bolts and nuts, $a^3$, one on each side of the beam. These perforations are so arranged, as will be seen, that the standard may be adjusted vertically at will. Between said parts, $a$, $a'$, near their lower ends, and near the front edges thereof, is pivoted a reversible colter, $b^3$, by means of a nut and bolt, $b'$, and said colter is held in position, by means of a nut and bolt, $b^2$, which bolt passes through said parts, $a$, $a'$, and one end of the colter, $b^3$. Said colter is provided with two cutting points, $c$, and two or more perforations, $c'$, and, in its rear, a recess, $c^2$, so that it may be operated without coming against the rear bolt and nut, $d'$. Said colter is bolted between said standard, by the bolt and nuts, $b'$ and $b^2$, with one end down, until its edge, $c$, becomes dull, then the other end is turned down. The point of said colter, may be set forward or back, by slipping the standard, A, back or forward on the beam, B, as indicated by the dotted lines. To the rear of said colter standard and near the lower end, is pivoted one end of an adjustable brace, E, the other end of which is pivoted in the plow standard, $c$, immediately under the beam. Said adjustable brace, E, consists of three parts, $e$, $e'$, and a collar, $e^2$, said parts, $e$, $e'$, have perforations, $e^3$, and are bolted together by the bolt and nut, $e^4$.

Having described our invention, what we claim as new, and desire to secure by Letters Patent, is—

1. In combination with a plow, the colter standard A, in two parts $a$, $a'$, one on either side of the beam, and clamped thereto; colter $b$, having cutting edges $c$, and perforations $c'$, said colter bolted between said parts $a$, $a'$, near their lower ends, by the bolts and nuts $b'$, $b^2$, and adjustable brace E, having the parts $e$, $e'$, and $e^2$, said parts $e$, $e'$, having the perforations $e^3$, and secured together by means of the sleeve $e^2$, and bolt and nut $e^4$, substantially as shown and described and for the purposes set forth.

2. In combination with a plow, the colter standard A, in two parts, $a$, $a'$, one on either side of the beam, and clamped thereto; colter $b$, having cutting edges $c$, and perforations $c'$, said colter bolted between said parts $a$, $a'$, near their lower ends, and adjustable brace E, having the parts $e$, $e'$, and $e^2$; said parts $e$, $e'$, having the perforations $e^3$, and secured together by means of the sleeve $e^2$, and bolt and nut $e^4$, said brace having one end bolted to the lower ends of the parts $a$, $a'$, and its other end to the plow standard, substantially as shown and described and for the purposes set forth.

In testimony whereof we affix our signatures in presence of two witnesses.

THOMAS JEFFERSON RAWLS.
WILLIAM RAWLS.

Witnesses:
JASPER JEFFERSON DEAN,
HENRY HAMILTON DAWKINS.